G. JOHNSTON.
RAIL SAW.
APPLICATION FILED FEB. 28, 1912.

1,105,794.

Patented Aug. 4, 1914.
2 SHEETS—SHEET 1.

Witnesses:
H. B. Barrett
J. C. Carpenter

Inventor
Gustave Johnston
by Linthicum, Belt & Fuller
Attys.

G. JOHNSTON.
RAIL SAW.
APPLICATION FILED FEB. 28, 1912.
1,105,794.
Patented Aug. 4, 1914.
2 SHEETS—SHEET 2.
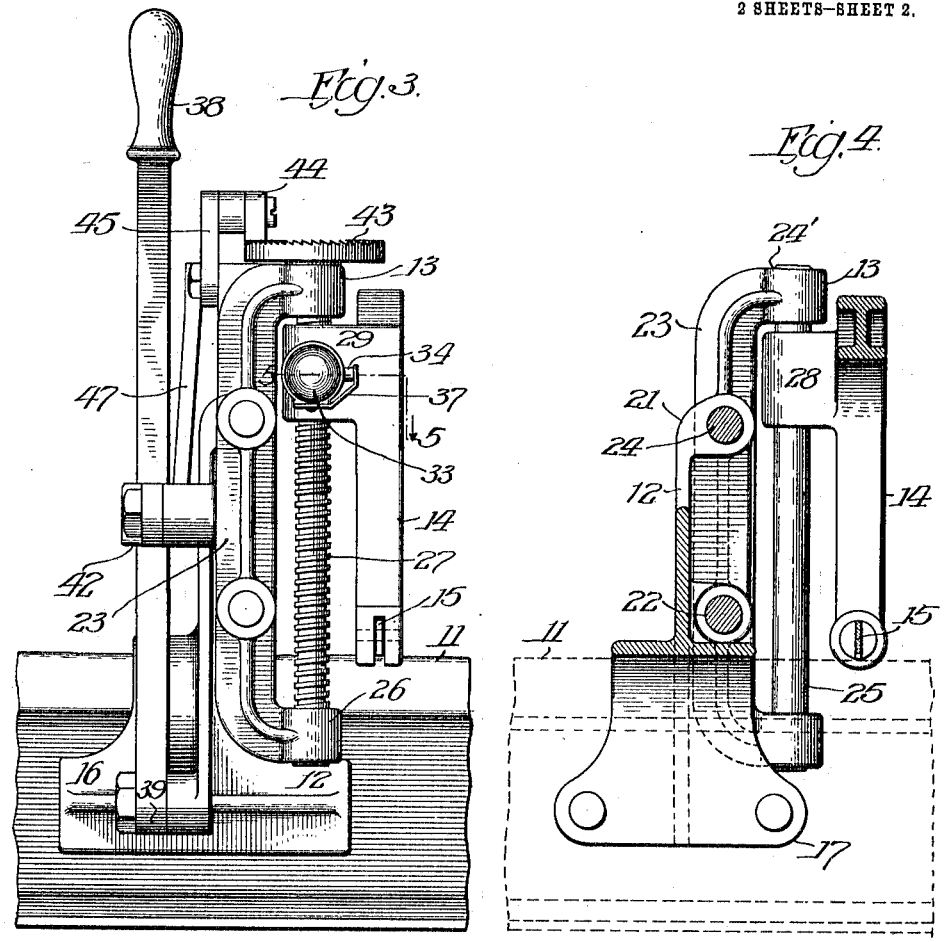
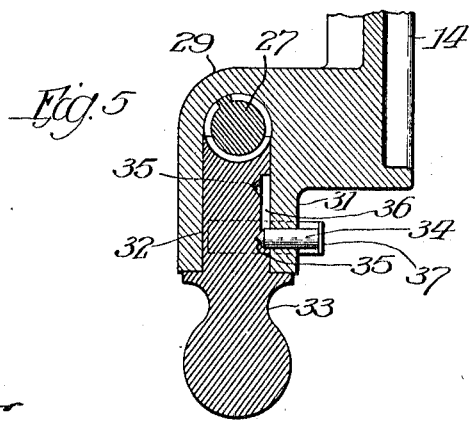

UNITED STATES PATENT OFFICE.

GUSTAVE JOHNSTON, OF JAMESTOWN, NEW YORK.

RAIL-SAW.

1,105,794. Specification of Letters Patent. Patented Aug. 4, 1914.

Application filed February 28, 1912. Serial No. 680,403.

*To all whom it may concern:*

Be it known that I, GUSTAVE JOHNSTON, a citizen of the United States, residing in Jamestown, in the county of Chautauqua and State of New York, have invented certain new and useful Improvements in Rail-Saws, of which the following is a specification.

My invention relates in general to saws, and more particularly to saws used in working metallic objects such as steel rails, I-beams, channel irons and the like, and has for its object, broadly, the provision of a holder and operating mechanism that will hold and guide the saw throughout its operation, insuring perfect and accurate work, and adding materially to the effective life of the saw blade.

A principal object of my invention is to provide a saw for rails, I-beams and the like with a mechanism that will maintain the saw in a single plane throughout each cutting operation, thereby preventing the blade from twisting or rubbing against the sides of the cut, and producing a true, even surface where the material is cut.

A further object of this invention is to provide the said saw with a mechanism that will feed it in proper equal amounts to the work at each reciprocation, insuring a smooth even action of the saw.

Further aims and advantages of my invention will be apparent as it is better understood from the following description, which taken in connection with the accompanying drawing illustrates one preferred embodiment thereof.

Figure 1:
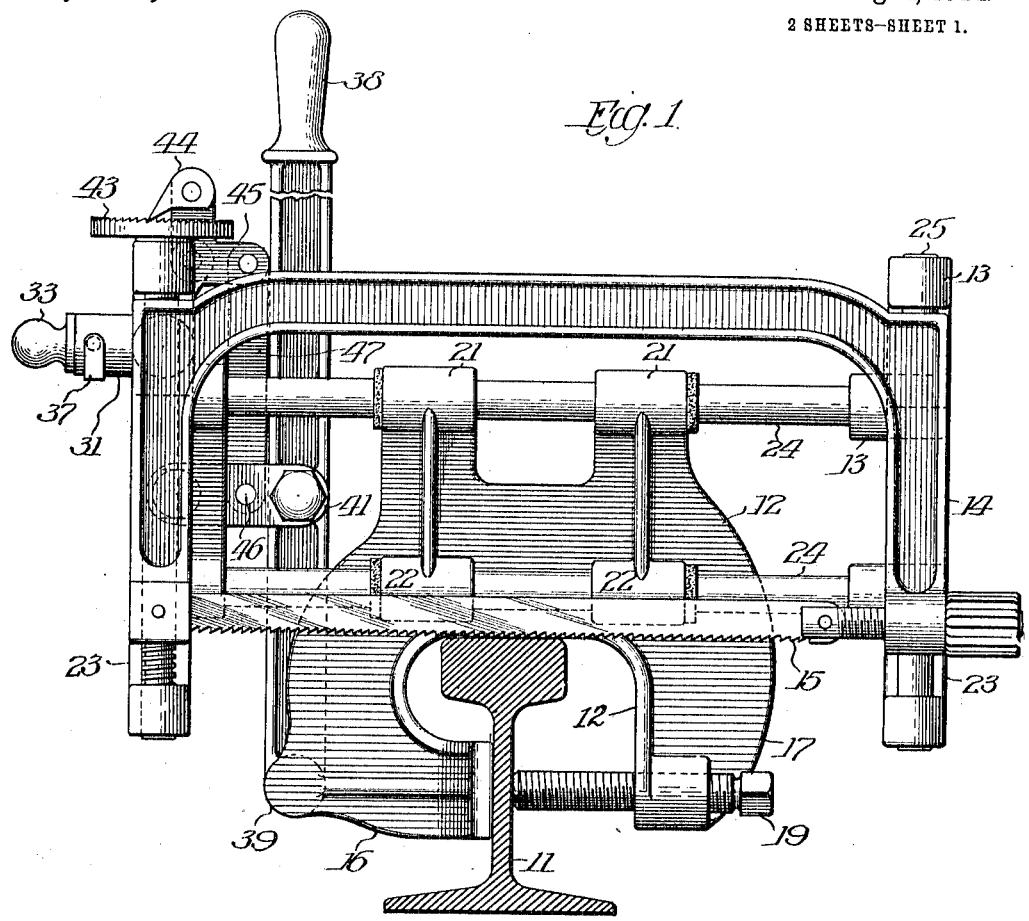
Figure 2:
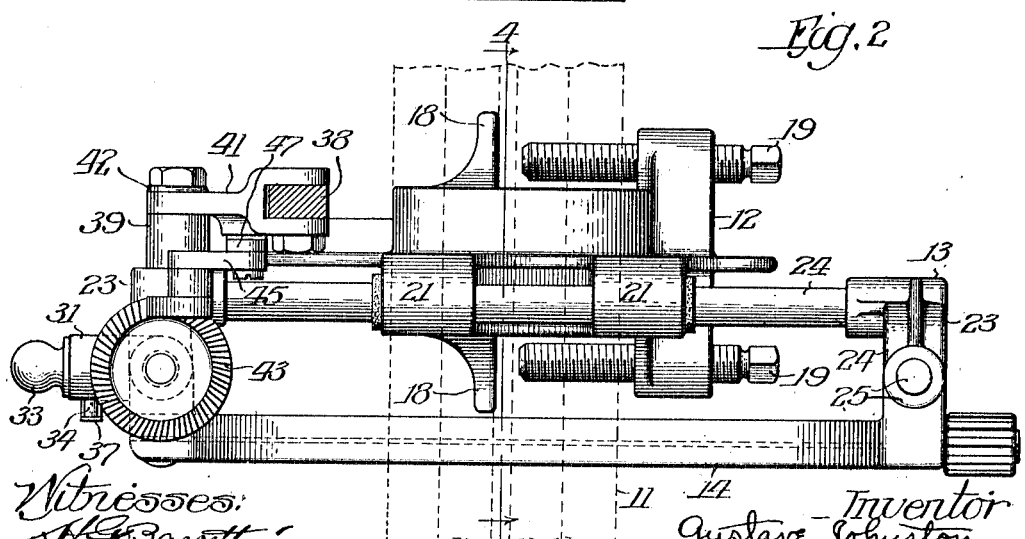

On the drawings:—Figure 1 is a side elevation of a saw provided with a mechanism made in pursuance of my invention, Fig. 2 is a top plan view of a device shown in Fig. 1, Fig. 3 is an end elevation of the said device, Fig. 4 is a vertical sectional view on the line 4—4 of Fig. 2, and Fig. 5 is an enlarged horizontal section on the line 5—5 of Fig. 3.

For the purposes of illustrating my invention I have shown the saw and its attendant mechanism in operative position upon a rail 11. The said mechanism consists of a clamping member 12, a reciprocating frame 13 and a saw holder 14 adapted to be automatically moved toward the work as the saw is reciprocated to feed the said saw to the work as will be hereinafter described. In the said yoke 14 is secured a saw blade 15 of any desired form adapted to cut the material of the rail or other object. The said clamping member is provided with the downwardly extending arms 16 and 17 spaced apart and adapted to be positioned upon opposite sides of the rail. The arm 16 terminates in a plane engaging surface formed by the oppositely disposed lugs 18 and the end of the arm, and the arm 17 is provided with a plurality of set screws 19 adapted to be screwed inwardly to secure the object to be sawed firmly against the plane surface at the end of the arm 16. The said clamping member is provided adjacent its top with a pair of alined bearings 21, beneath which are located a similar pair of alined bearings 22, said bearings being adapted to support the frame 13 as it reciprocates across the object clamped between the arms 16 and 17.

The frame 13 is composed of a pair of end members 23 connected by the rods 24, which are mounted in the bearings 21 and 22 respectively, and adapted to reciprocate therein. One of the end members 23 is composed of a curved yoke 24' and a smooth bearing rod 25 secured in the ends of the said yoke. The other member 23 is composed of a yoke 26 and a feeding screw 27, said screw being rotatably mounted in the ends of the said yoke, and operated as will be hereinafter disclosed.

The yoke 14 carrying the saw 15 may be of any desired form, and is provided with the rearwardly extending lugs 28 and 29, the lug 28 having an aperture therethrough which serves as a bearing for the rod 25. The lug 29 is provided with a similar aperture in which is loosely mounted the screw 27. This lug has also an outwardly disposed cylindrical shoulder 31 in which and communicating with the aperture in the said lug is provided an aperture 32. In the latter aperture is positioned the movable feeding member 33 adapted when in operative position to engage the screw 27 to move the yoke 14 and saw 15 to and from the rail 11 as the said screw is rotated. To maintain the member 33 in operative and inoperative positions a locking pin 34 is provided. The said pin is positioned within an aperture in the shoulder 31, and has its end shaped to engage suitably formed recesses 35 provided in a slot 36 of the member 33. The said pin is normally urged in the direction of the said feeding member by means of a spring 37.

To reciprocate the said saw backward and forward across the rail 11, and to feed it downwardly at each reciprocation, I have provided the operating mechanism as follows:—A lever 38 is pivotally mounted on the arm 16 of the clamping member 12 as at 39. Connecting the said lever to the end yoke 26 of the frame 13 is provided a link 41 having one end pivotally secured to the said lever intermediate its ends, and having the other end pivotally secured to the yoke 26 as at 42. The screw 27 extends through the upper end of the yoke 26 and terminates in a ratchet wheel 43 which is adapted to be rotated by a pawl 44. This pawl is pivotally secured to and actuated by the bell-crank lever 45 mounted on the said yoke near its upper extremity. The other arm of the lever 45 is connected to the link 41 at a point intermediate its ends as at 46 by means of a link 47. After the saw and its mechanism have been clamped upon a rail or other object, the locking member 33 may be moved outwardly from the position shown in Fig. 5, the saw lowered into contact with the work and the member 33 returned to operative position. As the lever 38 is now oscillated the saw will reciprocate back and forth across the work, the oscillation of the lever serving also to feed the saw to the work, alternately engaging and disengaging the pawl 44 with its ratchet 43 by means of the link connections 46 and 47. After a cut has been made, and it is desired to return the saw to initial position, the feeding member or traveler 33 may be disposed in inoperative position by engaging the locking pin 34 with the inner recess 35 when the yoke carrying the saw may be moved upwardly as is shown in Fig. 1.

It will be manifest that a saw provided with a mechanism embodying my invention will operate in a single plane producing a true surface where the work is cut, and eliminating all danger of rubbing the saw against the sides of the cut, or twisting it as it is reciprocated back and forth.

It will be obvious, moreover, that various changes may be made in the minor details of construction, the arrangement of parts and the form of the said parts without departing from the spirit and scope of my invention as defined in the claims, or sacrificing any of its advantages, the form hereinbefore disclosed being merely one preferred embodiment thereof.

I claim:—

1. In a rail saw, the combination of a body provided with a plurality of slide bearings and adapted to be secured to a rail to be sawed, a frame comprising a plurality of rods slidably mounted in said bearings for longitudinal reciprocation across said rail, a plurality of upright guides carried by said frame, one of said guides being provided with threads, a saw holder mounted on said guides for movement toward and from the rail to be sawed, a saw blade carried by said holder, means for reciprocating said frame, mechanism operated by said reciprocating means for rotating said threaded guide during the cutting stroke of the saw, and a threaded block carried by said holder in position to engage said threaded guide whereby the holder is fed toward the work upon rotative movement of said threaded guide, said block being adapted to be withdrawn from operative relation to said guide whereby to permit movement of said saw to inoperative position.

2. In a rail saw, the combination of a body provided with a plurality of slide bearings and adapted to be secured to a rail to be sawed, a frame comprising a plurality of rods slidably mounted in said bearings for longitudinal reciprocation across said rail, a plurality of upright guides carried by said frame, one of said guides being provided with threads, a ratchet wheel mounted on the upper end of said threaded guide, a saw holder mounted on said guides for movement toward and from the rail to be sawed, a saw blade carried by said holder, an operating handle pivoted on said body, a link connecting said handle and said frame whereby the frame is reciprocated, a bell crank lever pivoted on said frame, means connecting one arm of said bell crank lever with said link whereby said bell crank lever is operated upon movement of said handle, and a pawl carried by the other arm of said bell crank lever in position to engage with said ratchet wheel on the upper end of the threaded guide, the connections between said handle and said ratchet wheel being adapted to rotate said ratchet wheel to feed the saw toward the work during the cutting stroke thereof.

GUSTAVE JOHNSTON.

Witnesses:
W. A. STEVENSON,
FRED W. KLEB.

Copies of this patent may be obtained for five cents each, by addressing the "Commissioner of Patents, Washington, D. C."